US012672646B1

(12) United States Patent
Logan

(10) Patent No.: US 12,672,646 B1
(45) Date of Patent: Jul. 7, 2026

(54) FISHING LURE

(71) Applicant: Michael Logan, Harrodsburg, KY (US)

(72) Inventor: Michael Logan, Harrodsburg, KY (US)

( * ) Notice: Subject to any disclaimer, the term of this patent is extended or adjusted under 35 U.S.C. 154(b) by 0 days.

(21) Appl. No.: 18/784,289

(22) Filed: Jul. 25, 2024

Related U.S. Application Data

(60) Provisional application No. 63/515,365, filed on Jul. 25, 2023.

(51) Int. Cl.
*A01K 85/00* (2006.01)
*A01K 85/18* (2006.01)

(52) U.S. Cl.
CPC .......... *A01K 85/18* (2013.01); *A01K 85/1803* (2022.02); *A01K 85/1837* (2022.02); *A01K 85/1841* (2022.02)

(58) Field of Classification Search
None
See application file for complete search history.

(56) References Cited

U.S. PATENT DOCUMENTS

| | | |
|---|---|---|
| 6,718,684 B2 | 4/2004 | Yong-Set |
| 6,836,997 B2 | 1/2005 | Cramsey |

| | | | |
|---|---|---|---|
| 7,263,798 B2 | 9/2007 | Nichols | |
| 11,589,565 B1 * | 2/2023 | Chan ...................... A01K 85/01 |
| 2007/0006518 A1 | 1/2007 | Claverie, III | |
| 2009/0300964 A1 | 12/2009 | Nemethy | |
| 2013/0192121 A1 * | 8/2013 | Ford ...................... A01K 85/00 |
| 2015/0208627 A1 | 7/2015 | Coniglio et al. | |
| 2016/0360737 A1 * | 12/2016 | Yates ...................... A01K 85/18 |
| 2022/0159938 A1 * | 5/2022 | Soll ......................... A01K 85/16 |
| 2023/0157267 A1 * | 5/2023 | Peterson ............... A01K 85/16 |

* cited by examiner

*Primary Examiner* — Joshua J Michener
*Assistant Examiner* — Henry Hooper Mudd
(74) *Attorney, Agent, or Firm* — Stites & Harbison, PLLC; Terry L. Wright

(57) ABSTRACT

A fishing lure includes: an elongated lure body that includes a chamber with an open end; and a ballast moveably inserted in the chamber. The ballast can be selectively manipulated to assume different positions along a length of the chamber to tailor a buoyancy of the fishing lure to accommodate different fishing conditions. The elongated lure body can include multiple sections, with each section resembling a different portion of an organism which certain species of fish treat as prey. The respective sections of the elongated body can be pivotally connected so that the fishing lure mimics the movement of the organism which the fishing lure is intended to mimic as the fishing lure is pulled through a body of water.

13 Claims, 4 Drawing Sheets

FISHING LURE

CROSS-REFERENCE TO RELATED APPLICATION

The present application claims priority to U.S. Patent Application Ser. No. 63/515,365 filed on Jul. 25, 2023, the entire disclosure of which is incorporated herein by reference.

TECHNICAL FIELD

The present disclosure relates to fishing lures. In particular, certain embodiments of the present disclosure relate to a fishing lure that can be selectively manipulated to adjust the buoyancy of the fishing lure.

BACKGROUND

Artificial fishing lures are often used by individuals to catch fish in both salt and fresh water environments, including in rivers, lakes, and oceans. Such artificial fishing lures are generally formed from soft or hard materials that are often molded or otherwise formed into a predetermined configuration that resembles an organism, such as a worm, crayfish, or small bait fish, that may be desirable to certain fish species. Each artificial fishing lure thus often has a distinctive action and buoyancy when pulled through the water that is the result of the configuration and materials used to produce the particular lure. However, such a distinctive action and buoyancy as a result of the set configuration also results in a fishing lure that is not readily adaptable to different fishing conditions as the set configuration will generally result in the same action and buoyancy each time the fishing lure is pulled through the water. Accordingly, a fishing lure that is capable of mimicking the appearance of a desirable bait organism, but that can be readily adapted to provide different buoyancies and action through the water in order to meet a variety of fishing conditions would be both highly desirable and beneficial.

SUMMARY

The present disclosure includes a fishing lure that can be selectively manipulated to adjust the buoyancy of the fishing lure.

An exemplary fishing lure made in accordance with the present disclosure includes: an elongated lure body that includes a chamber with an open end; and a ballast moveably inserted in the chamber. In use, the ballast can be selectively manipulated to assume different positions along a length of the chamber to tailor a buoyancy of the fishing lure to accommodate different fishing conditions.

In some embodiments, the chamber is defined by a cylindrical wall of the elongated lure body that includes a threaded surface, and the ballast includes a corresponding threaded surface for securing the ballast in the chamber, which permit the ballast to be easily removed from the chamber or moved along the length of the chamber by rotating the ballast in a first or second rotational direction. Accordingly, in some embodiments, the ballast is removably inserted in the chamber. In some embodiments, the chamber extends perpendicular to a longitudinal axis of the elongated lure body.

In some embodiments, the elongated lure body includes multiple sections, where each section resembles a different portion of an organism which certain species of fish treat as prey. In some embodiments, the respective sections of the elongated lure body are pivotally connected so that the fishing lure mimics the movement of the organism as it is pulled through a body of water. In some embodiments, the elongated lure body resembles a fish, such as a bait fish. In some embodiments, the fishing lure further includes at least one of a first appendage that resembles a tail fin of the organism and a second appendage that resembles a dorsal fin of the organism connected to the elongated lure body. In some embodiments, the elongated lure body includes at least two sections, where each respective section of the elongated lure body is pivotally connected to at least one other section of the elongated lure body. In some embodiments, each section of the elongated lure body is pivotally connected to at least one other section of the elongated lure body via a pivot pin and one or more pivot fasteners. In some embodiments, the elongated lure body includes at least three sections pivotally connected together. In some embodiments, the elongated lure body defines one or more chambers in which one or more additional ballasts can be inserted to adjust the buoyancy of the fishing lure.

In some embodiments, the fishing lure includes one or more fasteners which can be utilized to connect a fishing line and/or one or more fishing hooks to the elongated lure body. In some embodiments, the fishing lure further includes a diving lip connected to the elongated lure body. In some embodiments, the fishing lure further includes one or more weights which can be selectively removably inserted in the chamber to further adjust the buoyancy of the fishing lure.

DESCRIPTION OF EXEMPLARY EMBODIMENTS

The present disclosure includes fishing lures that can be selectively manipulated to adjust the buoyancy of the fishing lure.

Figure 1:
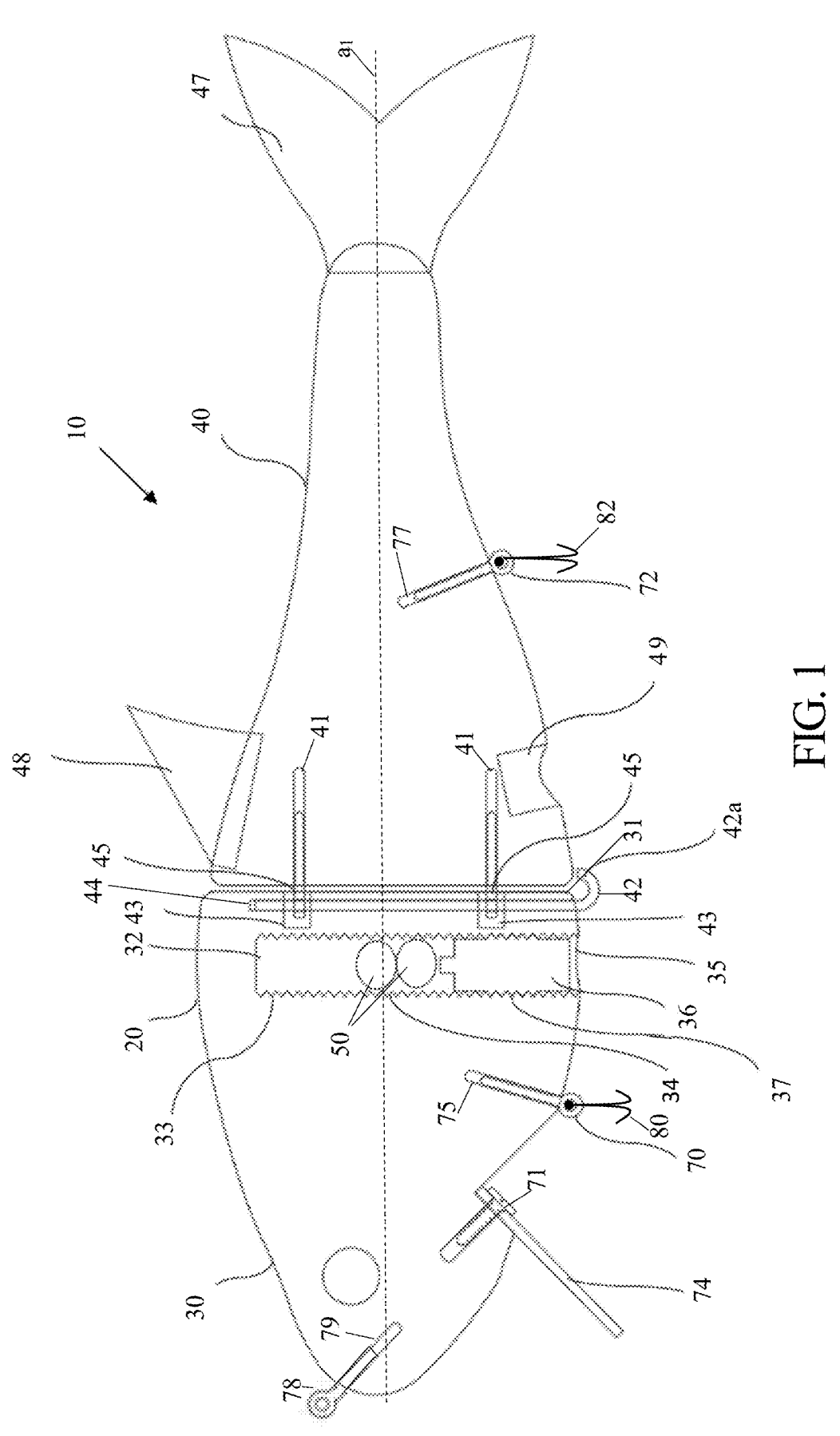
FIG. 1 is a side schematic view of an exemplary fishing lure made in accordance with the present disclosure.
Figure 2:
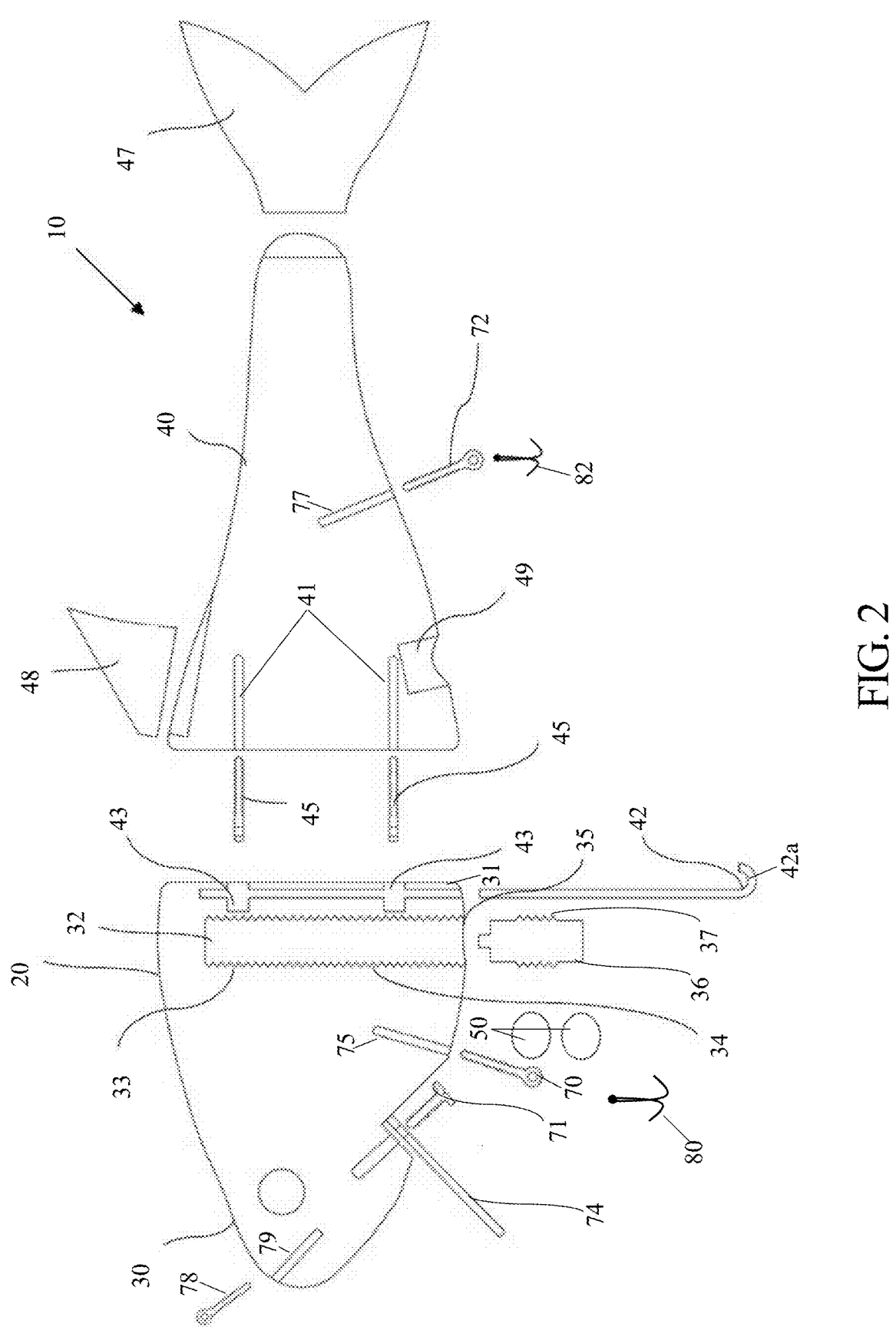
FIG. 2 is an exploded side schematic view of the exemplary fishing lure of FIG. 1.

FIGS. 1 and 2 show an exemplary fishing lure 10 made in accordance with the present disclosure. As shown, the fishing lure 10 includes: an elongated lure body 20 that defines, and thus may be characterized as including, a chamber 32; and a ballast 36 inserted in the chamber 32. The ballast 36 can be selectively manipulated to adjust the positioning of the ballast 36 along a length of the chamber 32 to tailor the buoyancy of the fishing lure 10 to accommodate different fishing conditions and vary the action exhibited by the fishing lure 10 as it is pulled through a body of water. The ballast 36 may thus be characterized as being moveably inserted in the chamber 32.

Referring still to FIGS. 1 and 2, in this exemplary embodiment, the elongated lure body 20 includes a first section 30 and a second section 40 that is pivotally connected to the first section 30. As shown, in this exemplary embodiment, the first section 30 and the second section 40 of the elongated lure body 20 are each constructed as to resemble a different portion of an organism for which certain species of fish treat as prey. Specifically, in this exemplary embodiment, the first section 30 of the elongated lure body 20 resembles a head of a bait fish, and the second section 40 of the elongated lure body 20 resembles a portion of the bait fish that is located below the head, including the tail. In this regard, first section 30 of the elongated lure body 20 may be characterized as a "head section," and the second section 40 of the elongated lure body 20 may be characterized as a "tail section." As a result of the pivotal connection between the first section 30 and the second section 40 and the resemblance of the first section 30 and the second section 40 to that of different portions of the organism, the fishing lure 10 mimics both the appearance and lateral movement (e.g., swimming motion) of the organism as it is pulled through a water body.

Referring still to FIGS. 1 and 2, in this exemplary embodiment, chamber 32 extends upwardly from a bottom or ventral side of the elongated lure body 20 and is oriented generally perpendicular to a longitudinal axis, $a_1$, of the elongated lure body 20. As shown, in this exemplary embodiment, the chamber 32 is defined by the first section 30 of the elongated lure body 20, such that the chamber 32 includes an open end 35 along the bottom (or ventral) side of the elongated lure body 20 that permits insertion and removal of the ballast 36 from the chamber 32. More specifically, in this exemplary embodiment, the chamber 32 is defined by a cylindrical wall 33 of the first section 30 of the elongated lure body 20 that has a threaded surface 34 which extends along the entire length of the cylindrical wall 33. The ballast 36 also has, in this exemplary embodiment, a threaded surface 37 which corresponds to, and is configured to mate with, the threaded surface 34 of the cylindrical wall 33 of the first section 30. The mating of the threaded surface 34 of the cylindrical wall 33 of the chamber 32 to the threaded surface 37 of the ballast 36 thus permits the ballast 36 to be secured within the chamber 32 and to create an air- and water-tight space within the first section 30 of the elongated lure body 20. The threaded construction of the cylindrical wall 33 defining the chamber 32 and the ballast 36 also permits the ballast 36 to be easily removed from the chamber 32 or moved along the full length of the chamber 32 to modulate the volume of closed space within the chamber 32 and to modulate the buoyancy of the fishing lure 10 by rotating the ballast 36 in a first rotational direction (e.g., clockwise) or a second rotational direction (e.g., counterclockwise). To facilitate rotation of the ballast 36, the ballast 36 may be configured to receive the head of a screw driver or a hex key.

As further shown in FIGS. 1 and 2, the fishing lure 10 can further optionally include one or more weights 50 that can be selectively removably inserted into the chamber 32 and maintained in place by the ballast 36 to further adjust the buoyancy of the fishing lure 10 to a desired state. In instances where one or more weights 50 are inserted into the chamber 32, the perpendicular orientation of the chamber 32 relative to the longitudinal axis, $a_1$, of the elongated lure body 20 may prove particularly beneficial with respect to preserving the consistency of the buoyancy and/or action of the fishing lure 10 when in use. In this regard, the perpendicular orientation of the chamber 32 permits the one or more weights 50 to be provided on top of the ballast 36 while the fishing lure 10 is in use. Accordingly, as weights 50 are added or subtracted, they are maintained along the same general vertical plane, which can help to keep wobbling of the fishing lure 10 consistent and tight while the fishing lure 10 is in use, whereas a horizontally oriented chamber may distribute the weights lengthwise across the fishing lure and promote more dramatic and/or less consistent wobbling of the fishing lure 10 when in use. In this exemplary embodiment, both the ballast 36 and the one or more weights 50 are constructed of a tungsten due to such material's resistance to corrosion. Of course, in alternative embodiments, the ballast 36 and/or one or more weights 50 may be constructed of different metal or other weighted material.

It should be appreciated that while the chamber 32 is generally described above as extending perpendicular to the longitudinal axis, $a_1$, of elongated lure body 20 and with the open end 35 of the chamber 32 being provided along the bottom side of the elongated lure body 20, alternative embodiments in which the chamber 32 is alternatively oriented relative to the longitudinal axis, $a_1$, and/or the open end 35 of the chamber 32 is provided elsewhere along the elongated lure body 20 are also contemplated herein. For instance, in one alternative embodiment, the open end 35 of the chamber 32 may be provided along the top (or dorsal) side of the elongated lure body 20.

Referring still to FIGS. 1 and 2, to pivotally connect the first section 30 to the second section 40 of the elongated lure body 20 together, in this exemplary embodiment, the fishing lure 10 further includes a pivot pin 42 and one or more pivot fasteners 45, with each pivot fastener of the one or more pivot fasteners 45 including an eyelet (not shown) configured to receive the pivot pin 42 therethrough. In particular, in the exemplary embodiment, the fishing lure 10 includes two pivot fasteners 45 that are connected to, and extend from, the second section 40 toward the first section 30 of the elongated lure body 20. Of course, alternative embodiments in which a single pivot fastener, as well as alternative embodiments in which more than two pivot fasteners are utilized, are also contemplated herein.

Referring still to FIGS. 1 and 2, in this exemplary embodiment, each pivot fastener 45 is in the form of an eyelet screw with a proximal end that defines the eyelet of the pivot fastener 45 and a threaded body that is configured to be inserted into a channel 41 which is defined by the second section 40 of the elongated lure body 20 and which extends parallel to the longitudinal axis, $a_1$, of the elongated lure body 20. In this regard, the pivot fasteners 45 are of the same construction as the hook fasteners 70, 72 illustrated in FIGS. 1 and 2 and discussed below. Accordingly, in this exemplary embodiment, the extent to which each pivot fastener 45 protrudes out of the second section 40 can be selectively adjusted by turning the pivot fastener 45 in a first rotational direction (e.g., clockwise) and a second rotational direction (e.g., counterclockwise). In some embodiments, the interior surfaces of the second section 40 defining each channel 41 may be a threaded surface which corresponds to, and is configured to mate with, the threaded body of the pivot fastener 45 corresponding thereto. In some embodiments, the channels 41 in which the pivot fasteners 45 are received may be initially established by virtue of the pivot fasteners 45 being screwed into the second section 40 of the elongated lure body 20. The extent to which the pivot fasteners 45 protrude out of the second section 40 will affect the spacing between the first section 30 and the second section 40 of the elongated lure body 20. In other words, the spacing between the first section 30 and the second section 40 of the elongated lure body 20, and thus overall length exhibited by the assembled fishing lure 10, can be adjusted by adjusting the extent to which the pivot fasteners 45 are deposited in the second section 40.

Referring now again to FIGS. 1 and 2, in this exemplary embodiment, the first section 30 of the elongated lure body 20 is configured to receive the eyelet of each of pivot fastener 45. In this regard, the first section 30 defines a number of slots 43 that is equal to the number of pivot fasteners 45, which, again, in this case, there are two. The first section 30 of the elongated lure body 20 also defines, in this exemplary embodiment, a channel 44 which is config-ured to receive the pivot pin 42, and which extends trans-verse to each slot 43 and the longitudinal axis, $a_1$, of the elongated lure body 20, such that the pivot pin 42 can be removably inserted into the channel 44 and through each slot 43. Accordingly, when the eyelets of the pivot fasteners 45 are deposited within each slot 43, the pivot pin 42 can be inserted into the channel 44 to establish the pivot connection between the first section 30 and the second section 40 of the elongated lure body 20. As shown, in this exemplary embodiment, the proximal end of the pivot pin 42 defines a hook 42a that is configured to receive an edge 31 of the first section 30 of the elongated lure body 20 and is sized so that the pivot pin 42 remains inserted in the channel 44 when the edge 31 of the first section 30 is received in the hook 42a. Where the hook 42a of the pivot pin 42 is positioned outside of the elongated lure body 20, the hook 42a, in addition to maintaining the pivot pin 42 in position in the channel 44, also serves as a handle that can be engaged by a user to pull the pivot pin 42 out of the channel 44. In some embodi-ments, the pivot pin 42 may additionally or alternatively be maintained in the channel 44 by virtue of a friction fit between the pivot pin 42 and interior surface of the first section 30 defining the channel 44. As result of the foregoing pivot pin 42 and pivot fastener 45 arrangement, the first section 30 and the second section 40 of the elongated lure body 20 can be easily detached from one another by removal of the pivot pin 42 from the channel 44. In this way, the first section 30 and/or the second section 40 of the elongated lure body 20 can be readily replaced should it become damaged or interchanged with a different body section resembling a different type of organism to provide a fishing lure of a different style or configuration.

Referring still to FIGS. 1 and 2, in addition to the ability of the first section 30 and second section 40 to pivot relative to one another and the adjustable buoyancy provided by the chamber 32 and ballast 36, the fishing lure 10 can further include a number of additional components that affect buoyancy and/or action of the fishing lure 10 in order to meet a variety of fishing conditions. For instance, in this exemplary embodiment, the second section 40 also defines, and thus may be characterized as including, an additional chamber 49 in which an additional ballast (not shown) can be selectively inserted to adjust the buoyancy of the fishing lure 10. Moreover, in this exemplary embodiment, the fishing lure 10 further includes a removable diving lip 74 that is attached to the first section 30 of the elongated lure body 20 to provide the fishing lure 10 with a particular diving profile as it is moved through a body of water. In this regard, and in this exemplary embodiment, the first section 30 of the elongated lure body 20 also defines a channel 73 configured to receive a fastener 71, such as a screw, to attach the diving lip 74 to the first section 30. It is contemplated that any number of diving lip types or configurations can be included to provide a desired diving profile without depart-ing from the spirit and scope of the present disclosure.

Referring still to FIGS. 1 and 2, to further allow the fishing lure 10 to be efficiently and effectively used to catch fish, the fishing lure 10 in this exemplary embodiment also includes one or more standard features that are common in fishing lures. In this regard, and in this exemplary embodi-ment, the fishing lure 10 further includes a hook fastener 70 connected to the first section 30 of the elongated lure body

20 as well as an additional hook fastener 72 connected to the second section 40 of the elongated lure body 20 for con-necting one or more fishing hooks 80, 82 to the elongated lure body 20. As shown, in this exemplary embodiment, there are two hook fasteners 70, 72 connecting two hooks 80, 82 to the elongated lure body 20. In this exemplary embodiment, each hook fastener 70, 72 is in the form of an eyelet screw that is deposited in a channel 75, 77 defined by the first section 30 or the second section 40 of the elongated lure body 20. Additionally, in this exemplary embodiment, the fishing lure 10 further includes a fishing line fastener 78 for attaching a fishing line to the elongated lure body 20. In this exemplary embodiment, the fishing line fastener 78 is also in the form of an eyelet screw deposited in a channel 79 defined by the first section 30 of the elongated lure body 20.

Referring still to FIGS. 1 and 2, in this exemplary embodiment, the fishing lure 10 further includes one or more appendages 47, 48 that resemble certain portions of the organism to which the fishing lure 10 is intended to mimic. Specifically, in this exemplary embodiment, the fishing lure 10 includes a first appendage 47 that resembles a tail fin of a bait fish and a second appendage 48 that resembles a dorsal fin of a bait fish, each secured to the elongated lure body 20. The first appendage 47 and the second appendage 48 thus not only allow the fishing lure 10 to more accurately mimic natural bait, but also allow for further modulation of the action of the fishing lure 10 as it moves through a body of water. In this exemplary embodiment, the first appendage 47 and the second appendage are secured to the elongated lure body 20 using a waterproof, flexible adhesive. Of course, other suitable means for securing the first appendage 47 and the second appendage 48 to the elongated lure body 20 may also be employed without departing from the spirit and scope of the present disclosure.

Figure 3:
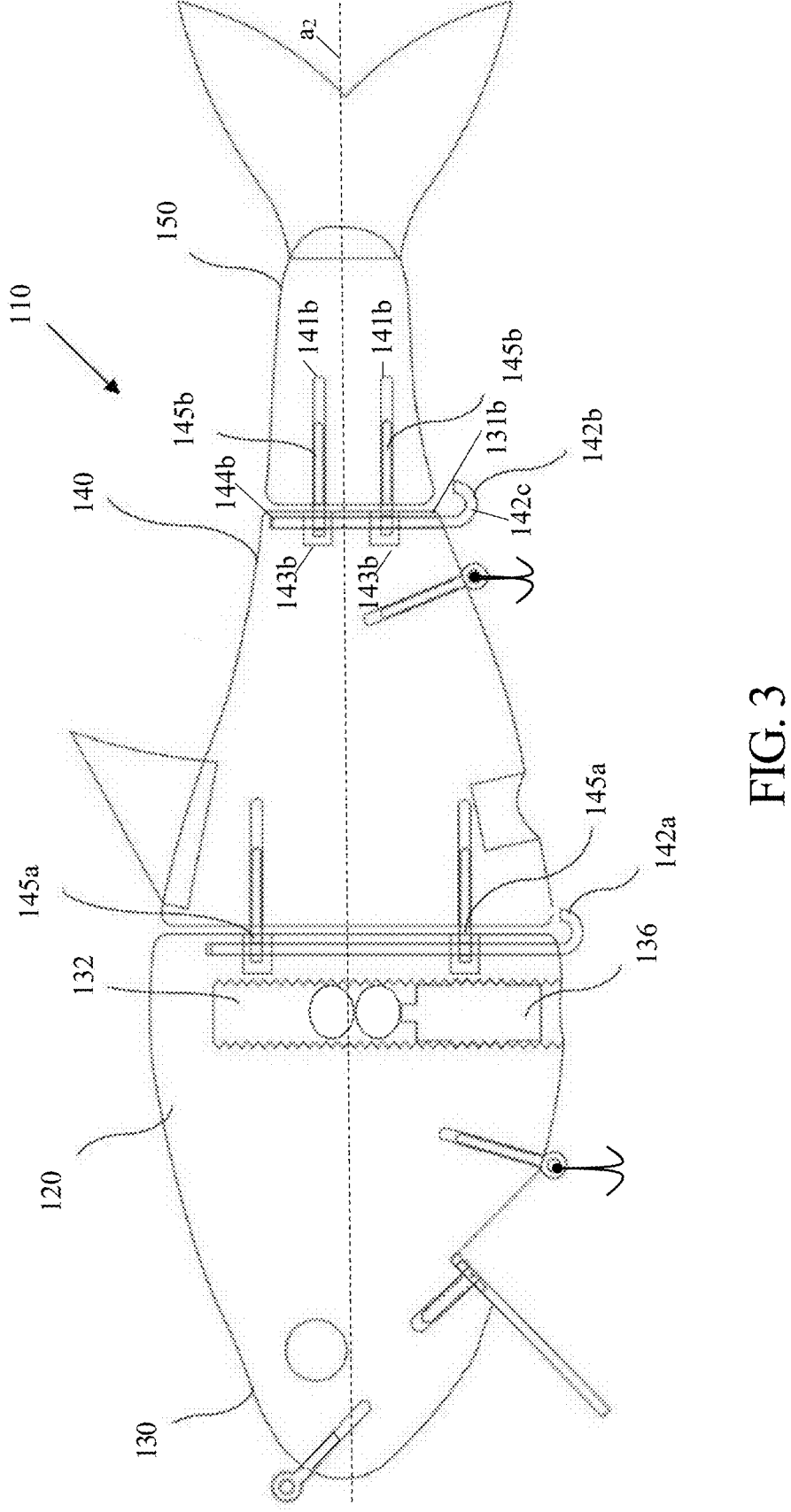
FIG. 3 is a side schematic view of another exemplary fishing lure made in accordance with the present disclosure.
Figure 4:
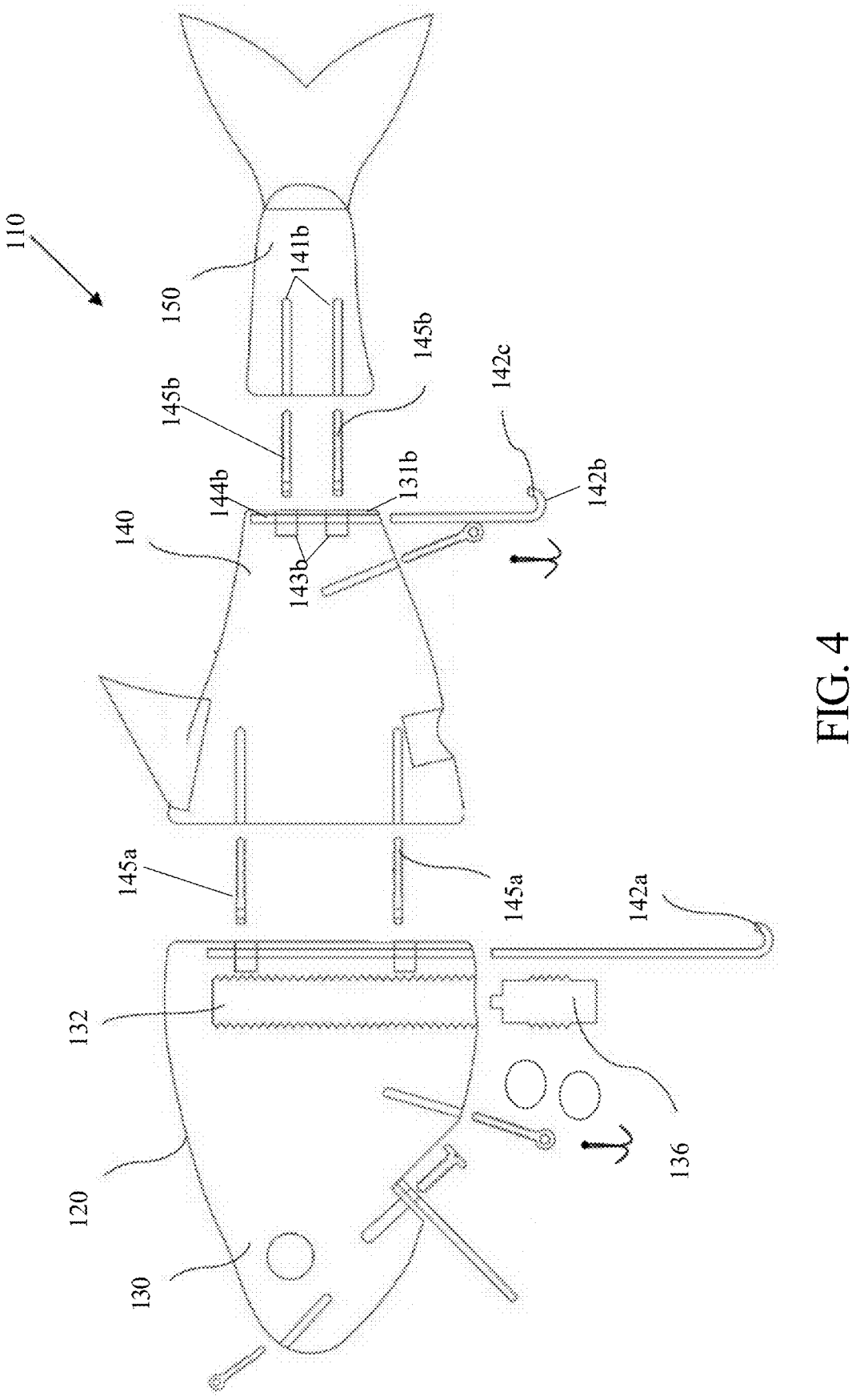
FIG. 4 is an exploded side schematic view of the exemplary fishing lure of FIG. 3.

FIGS. 3 and 4 show another exemplary fishing lure 110 made in accordance with the present disclosure.

Referring now to FIGS. 3 and 4, the fishing lure 110 is of the same construction and functions in the same manner as the fishing lure 10 described above with reference to FIGS. 1 and 2, except that, in this exemplary embodiment, the fishing lure 110 includes an additional pivoting section. Accordingly, like the fishing lure 10 described above with reference to FIGS. 1 and 2, the fishing lure 110 in this exemplary embodiment also includes an elongated lure body 120 having a first section 130 that defines a chamber 132 in which a ballast 136 can be received and selectively manipu-lated to affect the positioning of the ballast 136 along a length of the chamber 132 to adjust the buoyancy of the fishing lure 110. The first section 130 of the fishing lure 110 is also pivotally connected to a second section 140 of the fishing lure 110 via one or more pivot fasteners 145a and a pivot pin 142a in the same manner as the first section 30 and the second section 40 of the elongated lure body 20 described above with reference to FIGS. 1 and 2. However, in this exemplary embodiment, the second section 140 of the elongated lure body 120 resembles a portion of a bait fish that is located below the head of the bait fish (which is mimicked by the first section 130) and a tail of the bait fish, and the elongated lure body 120 further includes a third section 150 which resembles a tail of the bait fish. Accord-ingly, in this exemplary embodiment, the second section 140 and the third section 150 may be characterized as a "central section" and a "tail section," respectively.

Referring still to FIGS. 3 and 4, the third section 150 is pivotally connected to the second section 140 in similar fashion as the first section 130 and the second section 140. In this regard, a proximal end of the third section 150 defines one or more channels 141*b* in which one or more additional pivot fasteners 145*b* are received, with each additional pivot fastener 145*b* including an eyelet (not shown) configured to receive an additional pivot pin 142*b* therethrough and a threaded body. In particular, in the exemplary embodiment, the third section 150 defines two channels 141*b* in which two additional pivot fasteners 145*b* are inserted as to protrude outwardly from the third section 150 so that the eyelets of the pivot fasteners 145*b* can be deposited into two slots 143*b* defined by a distal end of the second section 140. In this exemplary embodiment, the distal end of the second section 140 also defines a channel 144*b*, which is configured to receive the additional pivot pin 142*b*, and which extends transverse to each slot 143*b* defined by the distal end of the section 140 as well as the longitudinal axis, $a_2$, of the elongated lure body 120, such that the pivot pin 142*b* can be removably inserted into the channel 144*b* and through each slot 143*b*. Accordingly, when the eyelets of the pivot fasteners 145*b* connected to the third section 150 are deposited within each slot 144*b* defined by the distal end of the second section 140, the pivot pin 142*b* can be inserted into the channel 144*b* to establish the pivot connection between the second section 140 and the third section 150 of the elongated lure body 120.

Referring still to FIGS. 3 and 4, as shown, in this exemplary embodiment, the proximal end of the pivot pin 142*b* inserted in the second section 140 also defines a hook 142*c* that is configured to receive an edge 131*b* of the second section 140 of the elongated lure body 120 and is sized so that the pivot pin 142*b* remains inserted in the channel 144*b* when the edge 131*b* of the second section 140 is received in the hook 142*c*. Where the hook 142*c* of the pivot pin 142*b* is positioned outside of the elongated lure body 120, the hook 142*c*, in addition to maintaining the pivot pin 142*b* in position in the channel 144*b* defined by the distal end of the second section 140, also serves as a handle that can be engaged by a user to pull pivot pin 142*b* out of the channel 144*b*. In some embodiments, the pivot pin 142*b* may additionally or alternatively be maintained in the channel 144*b* defined by the distal end of the second section 140 by virtue of a friction fit between the pivot pin 142*b* and interior surface of the second section 140 defining the channel 144*b*. As a result of the foregoing pivot pin 144*b* and pivot fastener 145*b* arrangement, the second section 140 and the third section 150 of the elongated lure body 120 can be easily detached from one another by removal of the pivot pin 142*b* from the pivot fasteners 145*b*. In this way, the third section 150 of the elongated lure body 120 can be readily replaced should it become damaged or interchanged with a different body section resembling a different type of organism to provide a fishing lure of a different style or configuration. Furthermore, as a result of the pivotal connection between the second section 140 and the third section 150, the potential lateral movement exhibited by the fishing lure 110 as it is pulled through a body of water is increased. In this way, the inclusion of the third section 150 and the pivot connection between the second section 140 and the third section 150 may cause the fishing lure 110 to more accurately mimic the swimming motion of the organism which the fishing lure 110 is intended to mimic. In some embodiments, the third section 150 may define an additional chamber (not shown) in the elongated lure body 120 in which an additional ballast (not shown) can be selectively inserted to further affect the buoyancy exhibited by the fishing lure 110.

Although the sections 30, 40, 130, 140, 150 of the elongated lure bodies 20, 120 of the fishing lures 10, 110 disclosed herein are generally illustrated within the drawings and sometimes described as resembling portions of a fish, it is appreciated that the sections 30, 40, 130, 140, 150 making up the elongated lure bodies 20, 120 can be modified to assume the appearance of different prey, such as crustaceans, without departing from the spirit and scope of the present disclosure. Furthermore, it should be appreciated that while the elongated lure bodies 20, 120 of the fishing lures 10, 110 disclosed herein are generally described and illustrated as including two or three sections 30, 40, 130, 140, 150 that are pivotally connected together, that the elongated lure bodies 20, 120 can be further divided into additional pivotally connected sections as desired to mimic a particular bait and/or to modulate the action of an organism moving through a body of water without departing from the spirit and scope of the present disclosure. In some instances, it may be desirable for the fishing lures 10, 110 to mimic an organism which exhibits little or no lateral movement as it moves through a body of water. Accordingly, alternative embodiments in which the elongated lure bodies 20, 120 of the fishing lures 10, 110 disclosed herein are of a unitary construction are also contemplated herein. Additionally, it should be appreciated that while the sections 30, 40, 130, 140, 150 of the elongated lure bodies 20, 120 of the fishing lures 10, 110 disclosed herein are primarily described herein as being pivotally connected by virtue of a pivot pin 42, 142*a*, 142*b* and pivot fastener 45, 145*a*, 145*b* connection, other configurations and means for pivotally connecting the sections of the elongated lure body 20, 120 can also be utilized without departing from the spirit and scope of the present disclosure. Such other configurations can include, but are not limited to, hinged arrangements as well as arrangements in which the sections to which the pivot pin 42, 142*a*, 142*b* and pivot fasteners 45, 145*a*, 145*b* are connected is reversed when the fishing lure 10, 110 is assembled. Alternative embodiments, in which the one or more pivot pins 42, 142*a*, 142*b* of the fishing lure 10, 110 are deposited into a the elongated lure body 20, 120 from a top side, as opposed to a bottom side, of the elongated lure body 20, 120 are also contemplated herein. Furthermore, alternative embodiments, in which the elongated lure body 20, 120 of the fishing lures 10, 110 disclosed herein is divided into multiple sections but are statically connected are also contemplated.

One of ordinary skill in the art will recognize that additional embodiments are also possible without departing from the teachings of the present disclosure or the scope of the claims which follow. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and may be made without departing from the spirit or scope of the claimed disclosure.

What is claimed is:

1. A fishing lure, comprising:
an elongated lure body, including
  a first section defining (i) a chamber with an open end provided along a bottom side or a top side of the elongated lure body, with the chamber extending perpendicular to a longitudinal axis of the elongated lure body, (ii) one or more slots, and (iii) a channel transverse to the one or more slots, and
  a second section pivotally connected to the first section;
one or more pivot fasteners connected to the second section of the elongated lure body, each pivot fastener of the one or more pivot fasteners including an eyelet deposited in a slot of the one or more slots defined by the first section of the elongated lure body;

a pivot pin removably inserted in the channel and through the one or more slots defined by the first section of the elongated lure body; and a ballast moveably inserted in the chamber, such that the ballast can be selectively manipulated to assume different positions along a length of the chamber to adjust a buoyancy of the fishing lure.

2. The fishing lure of claim 1, and further comprising:

a first appendage connected to a top side of the elongated lure body; and a second appendage connected to an end of the elongated lure body.

3. The fishing lure of claim 1, wherein the elongated lure body further includes a third section pivotally connected to the second section.

4. The fishing lure of claim 1, wherein the second section of the elongated lure body defines a second chamber for receiving a second ballast.

5. The fishing lure of claim 1, wherein the ballast is removably inserted in the chamber.

6. The fishing lure of claim 5, wherein the chamber is defined by a cylindrical wall including a threaded surface, and wherein the ballast includes a corresponding threaded surface for securing the ballast in the chamber.

7. The fishing lure of claim 5, and further comprising:

one or more weights removably inserted in the chamber.

8. The fishing lure of claim 1, and further comprising:

one or more fasteners connected to the elongated lure body, each fastener of the one or more fasteners including an eyelet for receiving a fishing hook or a fishing line.

9. The fishing lure of claim 8, and further comprising:

one or more fishing hooks attached to the elongated lure body via the one or more fasteners connected to the elongated lure body.

10. The fishing lure of claim 1, and further comprising:

a diving lip connected to the elongated lure body.

11. A fishing lure, comprising:

an elongated lure body, including a first section defining (i) a chamber, the chamber extending perpendicular to a longitudinal axis of the elongated lure body and including an open end provided along a bottom side or a top side of the elongated lure body, (ii) one or more slots, and (iii) a channel transverse to the one or more slots, and a second section pivotally connected to the first section;

one or more pivot fasteners, each pivot fastener of the one or more pivot fasteners including an eyelet deposited in a slot of the one or more slots defined by the first section of the elongated lure body;

a pivot pin removably inserted in the channel and through the one or more slots defined by the first section of the elongated lure body; and a ballast moveably inserted in the chamber, such that the ballast can be selectively manipulated to assume different positions along a length of the chamber to adjust a buoyancy of the fishing lure;

wherein the one or more pivot fasteners are connected to the second section of the elongated lure body, such that the one or more pivot fasteners can be rotated to affect the extent to which the one or more pivot fasteners protrude from the second section to affect the length of the fishing lure.

12. The fishing lure of claim 11, wherein the chamber is defined by a cylindrical wall including a threaded surface, and wherein the ballast includes a corresponding threaded surface for securing the ballast in the chamber.

13. The fishing lure of claim 11, wherein the elongated lure body further includes a third section pivotally connected to the second section.

* * * * *